United States Patent
Bui et al.

(10) Patent No.: US 6,934,109 B2
(45) Date of Patent: Aug. 23, 2005

(54) APPARATUS AND METHOD TO MONITOR THE RELATIVE POSITION OF A TAPE MEDIUM DISPOSED IN A TAPE DRIVE

(75) Inventors: Nhan X. Bui, Tucson, AZ (US); Randy C. Inch, Tucson, AZ (US); Junichi Fukuda, Sagamihara (JP); Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 10/645,059

(22) Filed: Aug. 21, 2003

(65) Prior Publication Data

US 2005/0041320 A1 Feb. 24, 2005

(51) Int. Cl.[7] .......................... G11B 15/18; G11B 15/48
(52) U.S. Cl. .................. 360/72.3; 360/74.2; 360/74.4; 242/324; 242/333.6; 242/357
(58) Field of Search ............................. 360/74.1, 74.2, 360/74.4, 74.5, 72.2, 72.3; 242/334.3, 324, 333, 333.1, 333.2, 333.6, 341, 349, 362, 333.7, 357

(56) References Cited

U.S. PATENT DOCUMENTS

| 4,331,307 A | 5/1982 | Furuta ........................ 242/186 |
| 4,378,917 A | 4/1983 | Negishi et al. ............. 242/186 |
| 4,411,008 A * | 10/1983 | d'Alayer de Costemore d'Arc et al. ................................ 377/18 |
| 4,801,853 A * | 1/1989 | Lewis et al. .................... 318/7 |
| 5,309,300 A | 5/1994 | Lee ............................ 360/74.2 |
| 5,379,165 A | 1/1995 | Pahr .......................... 360/78.2 |
| 5,600,504 A | 2/1997 | Seo ........................... 360/74.2 |
| 6,188,536 B1 | 2/2001 | Chliwnyi .................... 360/74.3 |
| 6,257,515 B1 * | 7/2001 | Fukuda et al. ........... 242/333.7 |
| 2003/0016465 A1 | 1/2003 | Bui et al. ................... 360/72.3 |

* cited by examiner

Primary Examiner—Andrew L. Sniezek
(74) Attorney, Agent, or Firm—Dale F. Regelman

(57) ABSTRACT

A method to monitor the relative position of a magnetic tape disposed in a tape drive, where that tape drive includes a first tape reel motor and a second tape reel motor. The method provides a magnetic tape disposed on a first tape reel, and releaseably attaches the first tape reel to the first tape reel motor. The method further provides a second tape reel attached to the second tape reel motor. The method operates the first tape reel motor and the second tape reel motor to transfer the tape from the first tape reel onto the second tape reel while maintaining a running second reel rotation count. The method sets a second reel rotation count limit, and determines if the running second reel rotation count exceeds that second reel rotation count limit. If the running second reel rotation count exceeds the second reel rotation count limit, then the method discontinues operation of the tape reel motors.

24 Claims, 5 Drawing Sheets ic # APPARATUS AND METHOD TO MONITOR THE RELATIVE POSITION OF A TAPE MEDIUM DISPOSED IN A TAPE DRIVE

FIELD OF THE INVENTION

This invention relates to an apparatus and method to operate a tape drive. More specifically, the invention relates to a method to monitor the longitudinal position of a magnetic tape disposed in a data storage device.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape typically includes one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. In certain embodiments, the one or more prerecorded servo tracks include longitudinal position signals disposed along the length of the tape medium.

What is needed is a method to monitor the unwinding of a tape from a supply tape reel onto a take-up reel to assure that the tape drive discontinues tape movement when an end of the tape is approaching. Applicants' method monitors the movement of a tape from a supply reel to a take-up reel by maintaining a running count of the rotations of the supply reel, maintaining a running count of the rotations of the take-up reel, and monitoring longitudinal position signals disposed in one or more servo signals written to the tape.

SUMMARY OF THE INVENTION

Applicants' invention includes an apparatus and method to monitor the relative position of a magnetic tape disposed in a tape drive, where that tape drive comprises a first tape reel motor and a second tape reel motor. The method provides a magnetic tape disposed on a first tape reel, where that magnetic tape includes a first end and a second end, and releaseably attaches the first tape reel to the first tape reel motor. The method further provides a second tape reel attached to the second tape reel motor.

The method operates the first tape reel motor and the second tape reel motor to transfer the tape from the first tape reel onto the second tape reel while maintaining a running second reel rotation count. The method sets a second reel rotation count limit, and determines if the running second reel rotation count exceeds that second reel rotation count limit. If the running second reel rotation count exceeds the second reel rotation count limit, then the method discontinues operation of the first tape reel motor and the second tape reel motor.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

Figure 1:
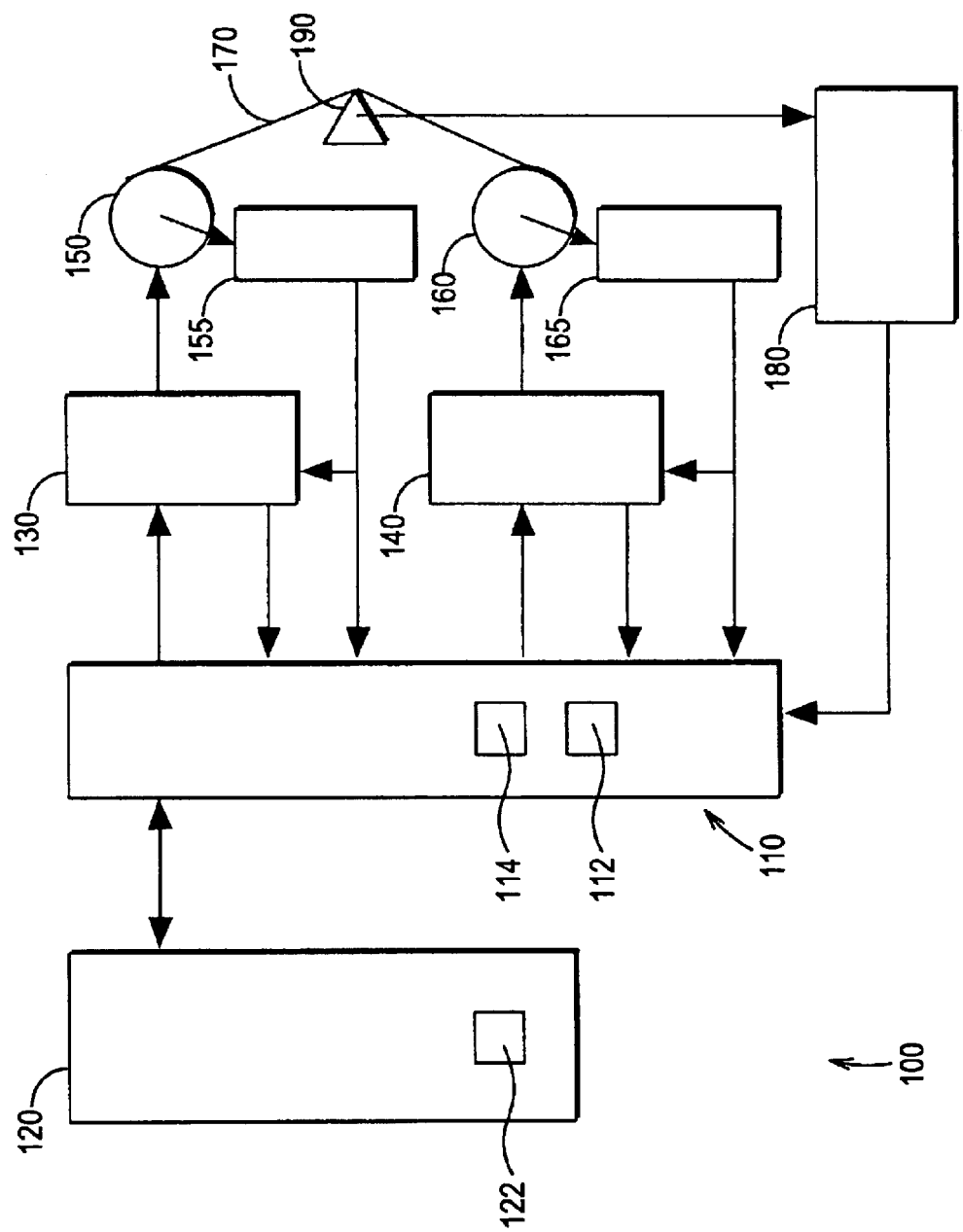
FIG. 1 is a block diagram of the servo mechanism disposed in Applicants' tape drive.

FIG. 1 shows servo control mechanism 100. Servo logic 110 is interconnected to servo processor 120, first motor controller 130, and second motor controller 140. First motor controller 130 operates first tape reel motor 310 (FIG. 3) which rotates first tape reel 150 in a first direction, i.e. clockwise for example, and optionally in a second direction, i.e. counterclockwise for example. In certain embodiments, tape reel motor 310 includes a plurality of hall sensors 155.

Second motor controller 140 operates second tape reel motor 320 (FIG. 3) which rotates second tape reel 160 in a first direction, i.e. clockwise for example, and optionally in a second direction, i.e. counterclockwise for example. In certain embodiments, tape reel motor 320 includes a plurality of hall sensors 165.

Depending on the direction of rotation, magnetic tape information storage medium 170 is moved between first tape reel 150 and second tape reel 160 past tape head 190. Multi-element tape head 190 includes a plurality of read/write elements to read and/or record information from and/or to a magnetic tape 170, and one or more servo sensors to detect servo signals comprising prerecorded servo signals on the magnetic tape 170. The one or more servo sensors provide information to servo decoder 180 which is interconnected to servo logic 110. In certain embodiments, magnetic tape head 190 comprises a thin-film magnetoresistive transducer.

The servo mechanism 100 may be bidirectional, in which certain of the read/write elements are selected for one direction of tape movement, and certain other read/write elements are selected for the opposite direction of movement. Servo logic 110 selects the appropriate read/write elements.

Figure 2:
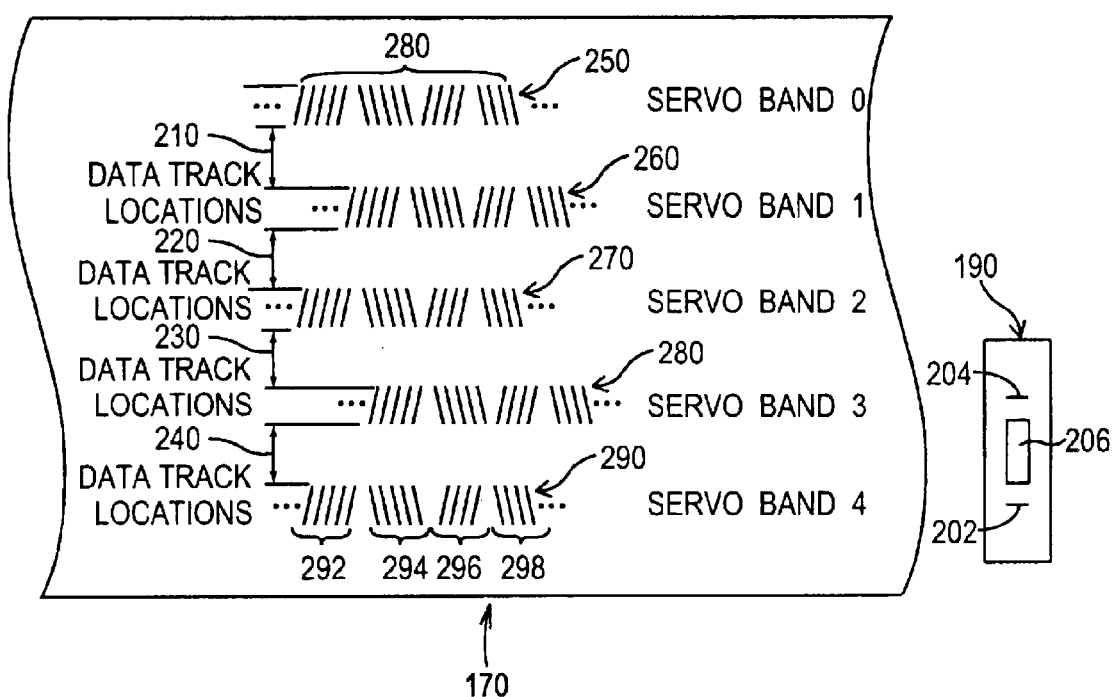
FIG. 2 is a diagrammatic illustration of a magnetic tape having parallel sets of linear servo signals.

Referring to FIG. 2, tape 170 includes one or more servo signals comprising transitions recorded at differing azimuthal orientations across the width of the servo track. In the specific example of FIG. 2, five longitudinal timing based defined servo bands 250, 260, 270, 280, and 290, are prerecorded on magnetic tape 170 for track following at these positions. The pattern of magnetic transitions recorded in the defined servo bands is a repeated set of frames 208, each of which are of different azimuthal orientations. In the example of FIG. 2, tape head 190 comprises at least two narrow servo read elements 202 and 204, allowing two servo bands to be sensed simultaneously, in combination with a plurality of read/write elements 206.

Longitudinal position ("LPOS") information is encoded within each set of servo bands. Tape 170 includes a first end, a second end, a length, and at least one linear servo signal extending from the first end to the second end. In certain embodiments, the LPOS information encoded in the servo signal(s) of tape 170 includes signals disposed along the length of the tape.

The LPOS information comprises numbers encoded sequentially along the length of the tape medium. Such LPOS numbers do not necessarily start at "1". For example, tape 170 may comprise LPOS numbers beginning with 50,000 encoded at the first end, i.e. at the beginning of the tape ("BOT"), and 135,000 encoded at the second end, i.e. at the end of tape ("EOT"). Tape 170 further includes intermediate numbers sequentially and regularly encoded between the BOT LPOS 50,000 and EOT LPOS 135,000. In certain embodiments, a tape having a length of about 610 meters includes about 85,000 LPOS numbers encoded along its length.

Figure 3A:
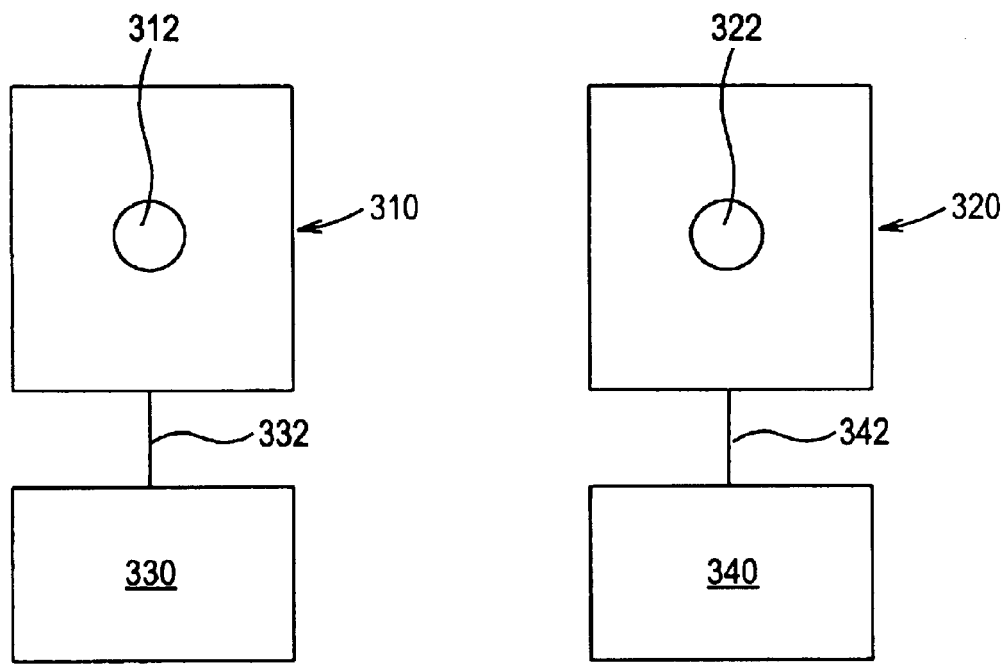
FIG. 3A is block diagram of a first tape reel motor and a second tape reel motor.

Referring now to FIG. 3A, servo mechanism 100 further includes tape reel motor 310. Tape reel motor 310 includes rotor 312. Rotor 312 is releaseably attachable to a tape reel. Tape reel motor 310 is interconnected with counter 330 by communication link 332.

Servo mechanism 100 further includes tape reel motor 320. Tape reel motor 320 includes rotor 322. Rotor 322 is releaseably attachable to a tape reel. Tape reel motor 320 is interconnected with counter 340 by communication link 342.

Figure 3B:
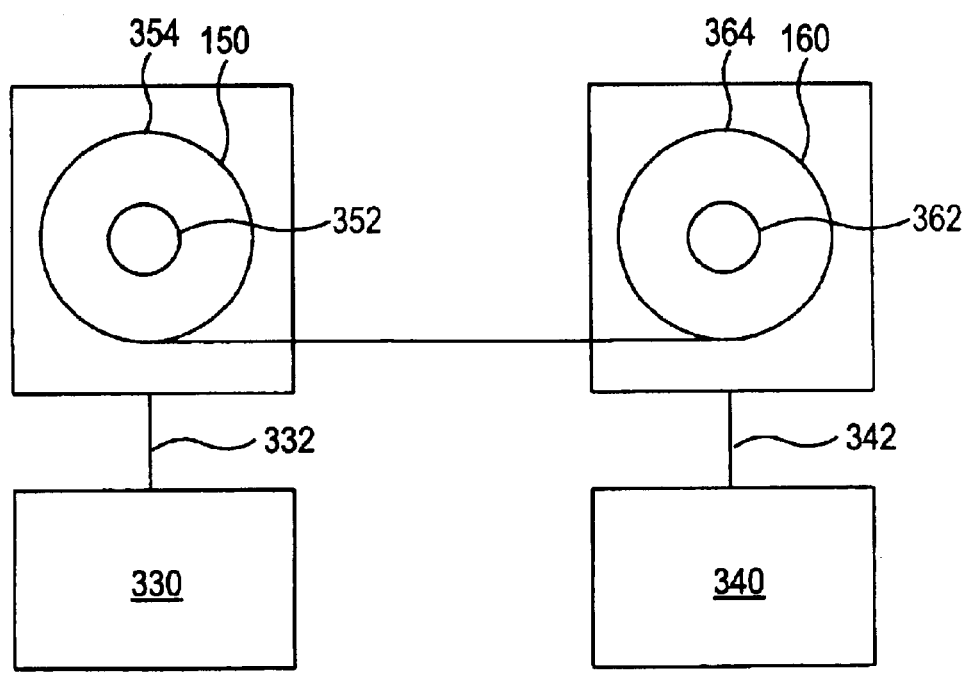
FIG. 3B is a block diagram showing a first tape reel, i.e. a supply reel, attached to the first tape reel motor and a second tape reel, i.e. a take-up reel, attached to the second tape reel motor.

Referring now to FIG. 3B, tape reel 150 (FIGS. 1, 3B) is releaseably attached to rotor 312. As those skilled in the art will appreciate, tape reel 150 comprises a central hub portion 352, and a first flange 354 extending outwardly from one end of hub 352, and a second flange (not shown in FIG. 3B) extending outwardly from a second end of hub 352, those flanges forming a tape channel.

Tape reel 160 (FIGS. 1, 3B) is releaseably attached to rotor 322. As those skilled in the art will appreciate, tape reel 160 comprises a central hub portion 362, and a first flange 364 extending outwardly from one end of hub 362, and a second flange (not shown in FIG. 3B) extending outwardly from a second end of hub 362, those flanges forming a tape channel.

The first end of tape 170 (FIGS. 1, 2, 3B) is attached to hub 352. The second end of tape 170 is attached to hub 362. As motor 310 causes rotor 312 to rotate in a first direction and as motor 320 causes rotor 322 to rotate in that same direction, tape 170 is caused to move from reel 150, past tape head 190, and onto reel 160.

When supply tape reel 150 is initially mounted in the tape drive, i.e. releaseably affixed to motor 310, tape 170 is entirely wound around that supply reel 150. Counter 330 is reset. As reels 150 and 160 are rotated and tape 170 is moved from reel 150 to reel 160, counter 330 maintains a running count of the number of rotations made by reel 150.

When supply tape reel 150 is initially mounted in the tape drive, take-up reel 160 is empty. Counter 340 is reset. As reels 150 and 160 are rotated and tape 170 is transferred from reel 150 to reel 160, counter 340 maintains a running count of the number of rotations made by reel 160.

When tape 170 is at the BOT, tape 170 is entirely disposed around the supply reel 150 and take-up reel 160 is empty. Initially, the radius of tape 170 wound around supply reel 150 is large, and no radius of tape is wound around take-up reel 160. Motors 310 and 320 operate to move tape 170 past tape head 190 at a constant velocity.

As tape 170 is unwound from supply reel 150, the effective radius of supply reel 150 decreases, and therefore, motor 310 increases the rate of rotation of reel 150 as tape 170 is transferred from reel 150 to reel 160. As tape 170 is wound onto take-up reel 160, the effective radius of take-up reel 160 increases, and therefore, motor 320 decreases the rate of rotation of reel 160 as tape 170 is transferred from reel 150 to reel 160.

Figure 4:
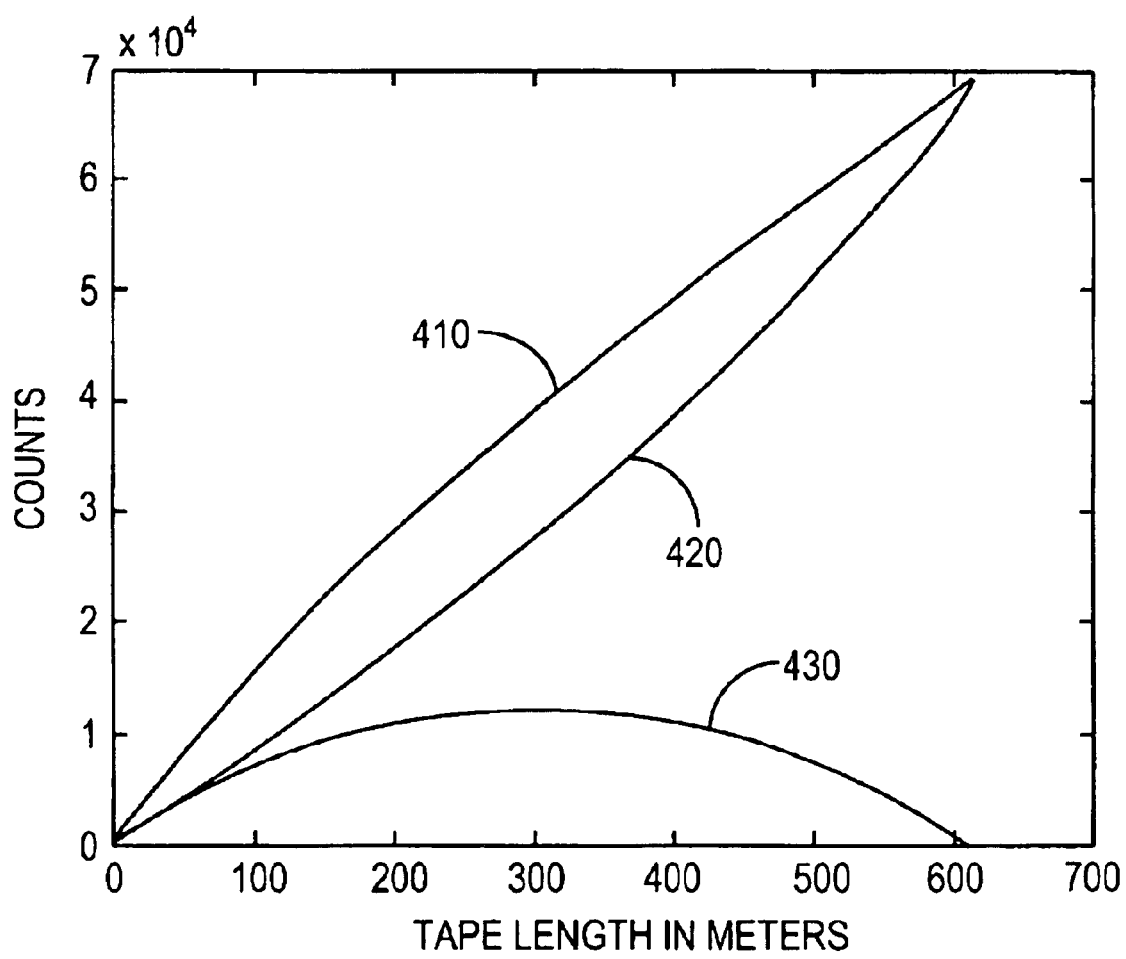
FIG. 4 is a graph showing curves for a running first tape reel rotation count, a running second tape reel rotation count, and a running difference count.

Referring now to FIG. 4, graph 400 includes curves 410, 420, and 430. Curve 410 graphically depicts the running rotation count for take-up reel 160 (FIGS. 1, 3B) as a function of tape length as tape 170 (FIGS. 1, 2, 3B) is transferred from supply reel 150 (FIGS. 1, 3B) to take-up reel 160. The number of rotations of take-up reel 160 is determined by counter 340 (FIGS. 3A, 3B).

Curve 420 graphically depicts the running rotation count for supply reel 150 as a function of tape length as tape 170 is transferred from supply reel 150 to take-up reel 160. The number of rotations of supply reel 160 is determined by counter 330 (FIGS. 3A, 3B).

Curve 430 graphically depicts the difference between curve 410 and curve 420. For the first half of the length of tape 170, take-up reel 160 rotates at a greater rate than does supply reel 150. Therefore, curve 430 increases as a function of tape length until the mid-point of the tape is reached. When more than half of tape 170 has been transferred to take-up reel 160, then supply reel 150 rotates at a greater rate than does take-up reel 160 thereafter. Therefore, curve 430 decreases as a function of tape length from the mid-point of the tape until the EOT is reached when curve 430 is 0.

In certain embodiments, motor 310 (FIG. 3A) and motor 320 (FIG. 3A) comprise brushless motors. As those skilled in the art will appreciate, brushless motors provide less maintenance, long life, low EMI, and quiet operation. Such motors produce more output power per frame size than PM or shunt wound motors and gear motors. Low rotor inertia improves acceleration and deceleration times while shortening operating cycles and their linear speed/torque characteristics produce predictable speed regulation. With brushless motors, brush inspection is eliminated making them ideal for limited access areas and applications where servicing is difficult.

Rotor motion is started by generating a revolving magnetic field in the stator windings which interacts with permanent magnet fields in the rotor. The revolving field is created by sequentially energizing the winding phase pairs. The winding phase pairs are energized with current flow in a set sequence to produce the desired direction of rotation. At any instant, two of the three phases are energized while the third phase is off. Energizing two phases simultaneously combines the torque output of both phases and increases overall torque output.

In these embodiments, motors 310 and 320 each comprise a plurality of hall sensors positioned at key spots in the motor such that when a magnet on the rotor is in correct alignment with a first winding in the motor, the hall sensor turns on. A torque amplifier uses this hall signal to know when to turn this first winding on. Applicants' brushless motor comprises several magnet poles disposed in the rotor. The positioning of the windings and the hall sensors determines the phasing of the motor. Each such phasing type has a certain sequence for turning on the various windings in the motor.

In these brushless motor embodiments, Applicants' method utilizes the hall signals generated by each brushless motor to maintain a running rotation count for that motor.

Thus, the hall signals generated by motor 320 driving the take-up reel are used to maintain a running rotation count for the take-up reel, i.e. a running T count. Similarly, the hall signals generated by motor 310 driving the supply reel are used to maintain a running rotation count for the supply reel, i.e. a running S count.

Figure 5:
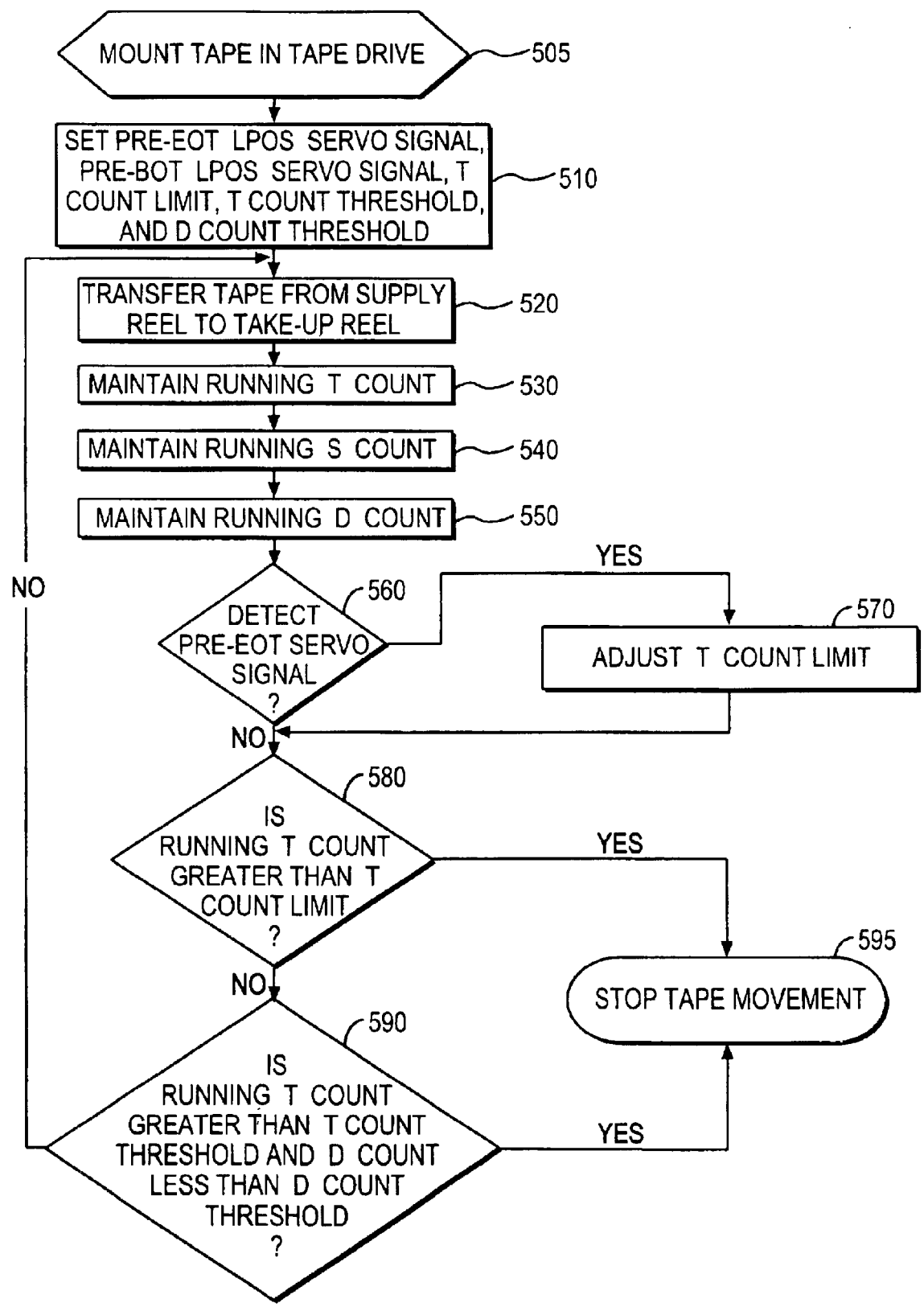
FIG. 5 is a flow chart summarizing the steps of Applicants' method.

Applicants' invention includes a method to monitor the relative position of a tape information storage medium as that tape moves in a tape drive, such as tape drive 100. FIG. 5 summarizes the steps of Applicants' method. The steps of FIG. 5 describe Applicants' method as a magnetic tape is moved in a first direction from a first tape reel, i.e. a supply reel, to a second tape reel, i.e. a take-up reel. Applicants' method is equally applicable to monitoring the relative position of the magnetic tape as that tape is moved in a second direction, i.e. the opposite direction, from the second tape reel onto the first tape reel.

Referring now to FIG. 5, in step 505 Applicants' method mounts a tape, such as tape 170 (FIGS. 1, 2, 3B), in a tape drive comprising servo mechanism 100. As those skilled in the art will appreciate, step 505 further includes providing a tape information storage medium having a first end, a second end, and a length; disposing that tape on a supply tape reel; and releaseably attaching that supply reel to a first motor, such as motor 310 (FIG. 3A), disposed in the tape drive.

In step 510, Applicants' method determines a PRE-BOT LPOS servo signal corresponding to a location disposed about 10 meters from the first tape end, and a PRE-EOT LPOS servo signal corresponding to a location disposed about 10 meters from the second tape end. For example, using tape having a BOT LPOS of 50,000 and an EOT LPOS of 135,000, Applicants' method determines a PRE-BOT LPOS servo signal of 70,000 and a PRE-EOT LPOS servo signal of 133,000.

Step 510 further includes setting an initial T Count Limit, i.e. an initial limit for the number of rotations of the take-up reel, such as take-up reel 160 (FIGS. 1, 3B). In certain embodiments, the initial T-Count Limit of step 510 comprises the expected running T Count when tape 170 (FIGS. 1, 2, 3B) has been advanced to the PRE-EOT location, i.e. about 10 meters from the EOT. In certain embodiments, the T-Count Limit of step 510 is disposed in firmware 112 (FIG. 1) disposed in servo logic 110 (FIG. 1).

Step 510 further includes setting a T Count Threshold, where that T Count Threshold is about thirty percent of the T Count Limit. Step 510 further includes setting a D Count Threshold.

In step 520, Applicants' method moves the tape, such as tape 170, from the supply reel, such as supply reel 150 (FIGS. 1, 3B), past a tape head, such as tape head 190 (FIGS. 1, 2), and onto a take-up reel, such as take-up reel 160 (FIGS. 1, 3B). In certain embodiments, step 520 is performed by servo logic, such as servo logic 110 (FIG. 1). As those skilled in the art will appreciate, step 520 further includes providing a supply tape reel disposed on a second motor, causing the first motor to rotate the supply reel in a first direction, and causing the second motor to rotate the take-up reel in the same direction.

In step 530, Applicants' method maintains a running T Count. In certain embodiments, step 520 is performed by servo logic, such as servo logic 110 (FIG. 1). In certain embodiments, the running T Count of step 530 comprises the total number of rotations of the take-up reel. In certain embodiments, the running T Count of step 530 comprises the number of hall signals generated by brushless motor 320 (FIG. 3A).

In step 540, Applicants' method maintains a running S Count. In certain embodiments, step 520 is performed by servo logic, such as servo logic 110 (FIG. 1). In certain embodiments, the running S Count of step 540 comprises the total number of rotations of the supply reel. In certain embodiments, the running S Count of step 540 comprises the number of hall signals generated by brushless motor 310 (FIG. 3A).

In step 550, Applicants' method maintains a running D Count, where that running D Count equals the difference between the running T Count and the running S Count. In certain embodiments, step 550 is performed by servo logic, such as servo logic 110 (FIG. 1).

As the tape is transferred from the supply reel to the take-up reel past the tape head, Applicants' method in step 560 determines if a servo sensor disposed on the tape head detects the PRE-EOT LPOS servo signal. In certain embodiments, step 560 is performed by servo logic 110 (FIG. 1).

If Applicants' method determines in step 560 that the PRE-EOT servo signal is not detected, then the method transitions from step 560 to step 580. If Applicants' method determines in step 560 that the PRE-EOT servo signal is detected, then the method transitions from step 560 to step 570 wherein the method adjusts the T Count Limit.

In certain embodiments, step 570 includes determining a PRE-EOT running second reel count when the PRE-EOT servo signal is detected. In certain embodiments, step 570 includes setting an Incremental T Count and adding that Incremental T count to the PRE-EOT running second reel count to form the adjusted T Count Limit of step 570. In certain embodiments, the Incremental T Count comprises the number of rotations of the take-up reel needed to advance tape 170 (FIGS. 1, 3B) from the PRE-EOT position to a location midway between the PRE-EOT position and the EOT. For example, if tape 170 (FIG. 1) has a length of about 610 meters, and if the PRE-EOT signal is disposed at about 600 meters from the BOT, then the Incremental T Count equals the number of rotations required to transfer another 5 meters of tape from the supply reel to the take-up reel. In certain embodiments, the Incremental T-Count Limit of step 570 is disposed in firmware 112 disposed in servo logic 110.

Applicants' method transitions from step 570 to step 580 wherein the method determines if the running T Count is greater than the T Count Limit. If Applicants' method determines in step 580 that the running T Count is greater than the T Count Limit, then the method transitions from step 580 to step 595 wherein the method stops tape movement, i.e. discontinues rotation of the supply reel and the take-up reel.

Alternatively, if Applicants' method determines in step 580 that the running T Count is not greater than the T Count Limit, then the method transitions from step 580 to step 590 wherein the method determines if the running T Count is greater than the running T Count Threshold of step 510, and if the running D Count is less than the running D Count Threshold of step 510.

In certain embodiments, the running T Count Threshold is about thirty percent (30%) of the T Count Limit. In certain embodiments, the running D Count Threshold is about five percent (5%) of the running D Count maximum. For example and referring again to FIG. 4, in the illustrated embodiment of FIG. 4 the running S Count and the running T Count both have maximum values of about 70,000 at the EOT. In the illustrated embodiment of FIG. 4, the running D Count has a maximum value of about 10,000 at about the mid-point of the tape, i.e. about 300 meters from the BOT and from the EOT.

Using the embodiment of FIG. 4, Applicants' method in step 590 determines if the running T Count is greater than about 21,000 and if the running D Count is less than about 500. As those skilled in the art will appreciate, using the illustrated embodiment of FIG. 4, if the running T Count is greater than about 21,000 and if the running D Count is less than about 500, then the tape is approaching the EOT.

If Applicants' method determines in step 590 that the running T Count is greater than about thirty percent (30%) of the T Count Limit, and if the running D Count is less than about five percent (5%) of the D Count maximum, then the method transitions from step 590 to step 595 and stops tape movement. Alternatively, if Applicants' method determines in step 590 that the running T Count is not greater than about thirty percent (30%) of the T Count Limit, or that the running D Count is not less than about five percent (5%) of the D Count maximum, then the method transitions from step 590 to step 520 and continues.

Applicants' invention further includes an article of manufacture comprising a computer useable medium, such as computer useable medium 122 (FIG. 1), having computer readable program code disposed therein to operate a tape drive using the steps of FIG. 5.

Applicants' invention further includes a computer program product, such as computer program product 114 (FIG. 1), usable with a programmable computer processor having computer readable program code embodied therein to operate a tape drive using the steps of FIG. 5.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to monitor the relative position of a magnetic tape disposed in a tape drive, wherein said tape drive comprises a first tape reel motor and a second tape reel motor, comprising the steps of:

providing a magnetic tape disposed on a first tape reel, said magnetic tape comprising a first end, a second end;

releaseably attaching said first tape reel to said first tape reel motor;

providing a second tape reel;

attaching said second tape reel to said second tape reel motor;

operating said first tape reel motor and said second tape reel motor to transfer said tape from said first tape reel onto said second tape reel;

maintaining a running second reel rotation count;

maintaining a running first reel rotation count;

calculating a running difference count comprising the difference between said running second reel rotation count and said running first reel rotation count;

setting a running second reel rotation threshold;

setting a difference count threshold;

operative if said running second reel rotation count is greater than said second reel rotation count threshold, determining if said running difference count is less than said difference count threshold;

operative if said running second reel rotation count is greater than said second reel rotation count threshold, and if said running difference count is less than said difference count threshold, discontinuing operation of said first tape reel motor and said second tape reel motor.

2. The method of claim 1, further comprising the steps of:

rotating said first tape reel in a first direction;

rotating said second tape reel in said first direction.

3. The method of claim 1, wherein said first tape reel motor comprises a brushless motor comprising a first rotor, a plurality of first magnetic poles disposed on said first rotor, and a plurality of first hall sensors disposed adjacent said first rotor, said method further comprising the steps of:

releaseably attaching said first tape reel to one end of said first rotor;

rotating said first rotor;

generating a plurality of first hall signals per rotation of said first rotor;

using said first hall signals to determine said running first reel rotation count.

4. The method of claim 3, further comprising the step of generating 24 first hall signals per rotation of said first rotor.

5. The method of claim 3, wherein said second tape reel motor comprises a brushless motor comprising a second rotor, a plurality of second magnetic poles disposed on said second rotor, and a plurality of second hall sensors disposed adjacent said second rotor, said method further comprising the steps of:

releaseably attaching said second reel to one end of said second rotor;

rotating said second rotor;

generating a plurality of second hall signals per rotation of said second rotor;

using said second hall signals to determine said running second reel rotation count.

6. The method of claim 5, further comprising the step of generating 24 second hall signals per rotation of said second rotor.

7. A method to monitor the relative position of a magnetic tape disposed in a tape drive, wherein said tape drive comprises a first tape reel motor, a second tape reel motor, and a tape head which includes at least one servo sensor capable of reading longitudinal position information, comprising the steps of:

providing a magnetic tape disposed on a first tape reel, said magnetic tape comprising a first end, a second end, and at least one servo signal extending from about said first end to about said second end, wherein said servo signal comprises longitudinal position information;

releaseably attaching said first tape reel to said first tape reel motor;

providing a second tape reel;

attaching said second tape reel to said second tape reel motor;

operating said first tape reel motor and said second tape reel motor to transfer said tape from said first tape reel onto said second tape reel;

maintaining a running second reel rotation count;

setting a second reel rotation count limit;

moving said magnetic tape adjacent said tape head;

determining a PRE-EOT LPOS servo signal;

determining if said PRE-EOT LPOS servo signal is detected;

operative if said PRE-EOT LPOS servo signal is detected, adjusting said second reel rotation count limit;

determining if said running second reel rotation count exceeds said second reel rotation count limit;

operative if said running second reel rotation count exceeds said second reel rotation count limit, discontinuing operation of said first tape reel motor and said second tape reel motor.

8. The method of claim 7, further comprising the steps of:

determining a PRE-EOT running second reel count when said PRE-EOT LPOS servo signal is detected;

determining an incremental second reel count; and adjusting said second reel rotation count limit to equal said PRE-EOT running second reel count plus said incremental second reel count.

9. An article of manufacture comprising a computer useable medium having computer readable program code disposed therein to monitor the relative position of a magnetic tape disposed in a tape drive, wherein said tape drive comprises a first tape reel motor, a second tape reel motor, and a second tape reel attached to said second tape reel motor, the computer readable program code comprising a series of computer readable program steps to effect:

releaseably attaching a first tape reel to said first tape reel motor, wherein said first tape reel includes a magnetic tape comprising a first end and a second end;

operating said first tape reel motor and said second tape reel motor to transfer said magnetic tape from said first tape reel onto said second tape reel;

maintaining a running second reel rotation count;

receiving a second reel rotation count limit;

maintaining a running first reel rotation count;

calculating a running difference count comprising the difference between said running second reel rotation count and said running first reel rotation count;

setting a running second reel rotation threshold;

setting a difference count threshold;

operative if said running second reel rotation count is greater than said second reel rotation count threshold, determining if said running difference count is less than said difference count threshold;

operative if said running second reel rotation count is greater than said second reel rotation count threshold, and if said running difference count is less than said difference count threshold, discontinuing operation of said first tape reel motor and said second tape reel motor.

10. The article of manufacture of claim 9, said computer readable program code further comprising a series of computer readable program steps to effect:

rotating said first tape reel in a first direction;

rotating said second tape reel in said first direction.

11. The article of manufacture of claim 9, wherein said first tape reel motor comprises a brushless motor comprising a first rotor, a plurality of first magnetic poles disposed on said first rotor, and a plurality of first hall sensors disposed adjacent said first rotor, said computer readable program code further comprising a series of computer readable program steps to effect:

releaseably attaching said first tape reel to one end of said first rotor;

rotating said first rotor;

receiving a plurality of first hall signals per rotation of said first rotor;

using said first hall signals to determine said running first reel rotation count.

12. The article of manufacture of claim 11, said computer readable program code further comprising a series of computer readable program steps to effect receiving 24 first hall signals per rotation of said first rotor.

13. The article of manufacture of claim 11, wherein said second tape reel motor comprises a brushless motor comprising a second rotor, a plurality of second magnetic poles disposed on said second rotor, and a plurality of second hall sensors disposed adjacent said second rotor, said computer readable program code further comprising a series of computer readable program steps to effect:

rotating said second rotor;

receiving a plurality of second hall signals per rotation of said second rotor;

using said second hall signals to determine said running second reel rotation count.

14. The article of manufacture of claim 13, said computer readable program code further comprising a series of computer readable program steps to effect receiving 24 second hall signals per rotation of said second rotor.

15. An article of manufacture comprising a computer useable medium having computer readable program code disposed therein to monitor the relative position of a magnetic tape disposed in a tape drive, wherein said magnetic tape comprises at least one servo signal extending from about said first end to about said second end, wherein said servo signal comprises longitudinal position information, wherein said tare drive comprises a first tape reel motor, a second tape reel motor, a second tape reel attached to said second tape reel motor, and a tape head which includes at least one servo sensor capable of reading said longitudinal position information, the computer readable program code comprising a series of computer readable program steps to effect:

releaseably attaching a first tape reel to said first tape reel motor, wherein said first tape reel includes a magnetic tape comprising a first end and a second end;

operating said first tare reel motor and said second tape reel motor to transfer said magnetic tape from said first tape reel onto said second tape reel;

maintaining a running second reel rotation count;

receiving a second reel rotation count limit;

moving said magnetic tape adjacent said tape head;

determining a PRE-EOT LPOS servo signal;

determining if said PRE-EOT LPOS servo signal is detected;

operative if said PRE-EOT LPOS servo signal is detected, adjusting said second reel rotation count limit;

determining if said running second reel rotation count exceeds said second reel rotation count limit;

operative if said running second reel rotation count exceeds said second reel rotation count limit, discontinuing operation of said first tape reel motor and said second tape reel motor.

16. The article of manufacture of claim 15, said computer readable program code further comprising a series of computer readable program steps to effect:

determining a PRE-EOT running second reel count when said PRE-EOT LPOS servo signal is detected;

receiving an incremental second reel count; and adjusting said second reel rotation count limit to equal said PRE-EOT running second reel count plus said incremental second reel count.

17. A computer program product usable with a usable with a programmable computer processor having computer readable program code embodied therein method to monitor the relative position of a magnetic tape disposed in a tape drive, wherein said tape drive comprises a first tape reel motor, a second tape reel motor, and a second tape reel attached to said second tape reel motor, comprising:

computer readable program code which causes said programmable computer processor to releaseably attach a first tape reel to said first tape reel motor, wherein said first tape reel includes a magnetic tape comprising a first end and a second end;

computer readable program code which causes said programmable computer processor to operate said first tape reel motor and said second tape reel motor to transfer said magnetic tape from said first tape reel onto said second tape reel;

computer readable program code which causes said programmable computer processor to maintain a running second reel rotation count;

computer readable program code which causes said programmable computer processor to maintain a running first reel rotation count;

computer readable program code which causes said programmable computer processor to calculate a running difference count comprising the difference between said running second reel rotation count and said running first reel rotation count;

computer readable program code which causes said programmable computer processor to receive a second reel rotation count threshold;

computer readable program code which causes said programmable computer processor to receive a difference count threshold;

computer readable program code which, if said running second reel rotation count is greater than said second reel rotation count threshold, causes said programmable computer processor to determine if said running difference count is less than said difference count threshold;

computer readable program code which, if said running second reel rotation count is greater than said second reel rotation count threshold, and if said running difference count is less than said difference count threshold, causes said programmable computer processor to discontinue operation of said first tape reel motor and said second tape reel motor.

18. The computer program product of claim 17, further comprising:

computer readable program code which causes said programmable computer processor to rotate said first tape reel in a first direction;

computer readable program code which causes said programmable computer processor to rotate said second tape reel in said first direction.

19. The computer program product of claim 17, wherein said first tape reel motor comprises a brushless motor comprising a first rotor, a plurality of first magnetic poles disposed on said first rotor, and a plurality of first hall sensors disposed adjacent said first rotor, further comprising:

computer readable program code which causes said programmable computer processor to releaseably attach said first tape reel to one end of said first rotor;

computer readable program code which causes said programmable computer processor to rotate said first rotor;

computer readable program code which causes said programmable computer processor to receive a plurality of first hall signals per rotation of said first rotor;

computer readable program code which causes said programmable computer processor to determine said running first reel rotation count using said first hall signals.

20. The computer program product of claim 19, further comprising computer readable program code which causes said programmable computer processor to receive 24 first hall signals per rotation of said first rotor.

21. The computer program product of claim 19, wherein said second tape reel motor comprises a brushless motor comprising a second rotor, a plurality of second magnetic poles disposed on said second rotor, and a plurality of second hall sensors disposed adjacent said second rotor, further comprising:

computer readable program code which causes said programmable computer processor to rotate said second rotor;

computer readable program code which causes said programmable computer processor to receive a plurality of second hall signals per rotation of said second rotor;

computer readable program code which causes said programmable computer processor to determine said running second reel rotation count using said second hall signals.

22. The computer program product of claim 21, further comprising computer readable program code which causes said programmable computer processor to receive 24 second hall signals per rotation of said second rotor.

23. A computer program product usable with a usable with a programmable computer processor having computer readable program code embodied therein method to monitor the relative position of a magnetic tape disposed in a tape drive, wherein said magnetic tape comprises at least one servo signal extending from about said first end to about said second end, wherein said servo signal comprises longitudinal position information, wherein said tape drive comprises a first tape reel motor, a second tape reel motor, a second tape reel attached to said second tape reel motor, and a tape head which includes at least one servo sensor capable of reading said longitudinal position information, comprising:

computer readable program code which causes said programmable computer processor to releaseably attach a first tape reel to said first tape reel motor, wherein said first tape reel includes a magnetic tape comprising a first end and a second end;

computer readable program code which causes said programmable computer processor to operate said first tape reel motor and said second tape reel motor to transfer said magnetic tape from said first tape reel onto said second tape reel;

computer readable program code which causes said programmable computer processor to maintain a running second reel rotation count;

computer readable program code which causes said programmable computer processor to receive a second reel rotation count limit;

computer readable program code which causes said programmable computer processor to move said magnetic tape adjacent said tape head;

computer readable program code which causes said programmable computer processor to determine a PRE-EOT LPOS servo signal;

computer readable program code which causes said programmable computer processor to determine if said PRE-EOT LPOS servo signal is detected;

computer readable program code which, if said PRE-EOT LPOS servo signal is detected, causes said programmable computer processor to adjust said second reel rotation count limit;

computer readable program code which causes said programmable computer processor to determine if said running second reel rotation count exceeds said second reel rotation count limit;

computer readable program code which, if said running second reel rotation count exceeds said second reel rotation count limit, causes said programmable computer processor to discontinue operation of said first tape reel motor and said second tape reel motor.

24. The computer program product of claim 23, further comprising:

computer readable program code which causes said programmable computer processor to determine a PRE-EOT running second reel count when said PRE-EOT LPOS servo signal is detected;

computer readable program code which causes said programmable computer processor to receive an incremental second reel count; and computer readable program code which causes said programmable computer processor to adjust said second reel rotation count limit to equal said PRE-EOT running second reel count plus said incremental second reel count.

* * * * *